US005668682A

United States Patent [19]
Matsumoto

[11] Patent Number: 5,668,682
[45] Date of Patent: Sep. 16, 1997

[54] HEAD LIFT MECHANISM IMPLEMENTED IN A REMOVABLE MAGNETIC DISK DRIVE

[75] Inventor: Takashi Matsumoto, Kawasaki, Japan

[73] Assignee: Fujitsu Limited, Kawasaki, Japan

[21] Appl. No.: 591,903

[22] Filed: Jan. 25, 1996

Related U.S. Application Data

[63] Continuation of Ser. No. 253,334, Jun. 3, 1994, abandoned.

[30] Foreign Application Priority Data

Sep. 9, 1993 [JP] Japan ................................ 5-224416

[51] Int. Cl.⁶ .................................................. G11B 5/54
[52] U.S. Cl. ................................................... 360/105
[58] Field of Search ........................... 360/97.01, 105, 360/106, 99.06

[56] References Cited

U.S. PATENT DOCUMENTS

| | | | |
|---|---|---|---|
| 5,023,737 | 6/1991 | Yaeger | 360/105 |
| 5,068,841 | 11/1991 | Nakayama et al. | 360/105 |
| 5,235,481 | 8/1993 | Kamo et al. | 360/99.06 |
| 5,296,985 | 3/1994 | Mochizuki et al. | 360/106 |
| 5,313,350 | 5/1994 | Dion | 360/105 |

FOREIGN PATENT DOCUMENTS

| | | |
|---|---|---|
| 60-12861 | 1/1985 | Japan . |
| 4311845 | 11/1992 | Japan . |
| WO93/10535 | 5/1993 | WIPO . |

Primary Examiner—Stuart S. Levy
Assistant Examiner—David D. Davis
Attorney, Agent, or Firm—Greer, Burns & Crain, Ltd.

[57] ABSTRACT

A magnetic disk drive which can be inserted into and removed from a slot formed in an information processing apparatus. The magnetic disk drive includes a magnetic disk mounted on a spindle assembly, a magnetic head for writing and reading out data onto and from the magnetic disk, an arm having the magnetic head supported at an end thereof, a shaft for supporting the arm for pivotal motion, and an actuator operatively connected to the other end of the arm for pivoting the arm around the shaft. The magnetic disk drive further includes a lift member movable between a first position in which it is spaced away from the arm to permit the magnetic head to be contacted with the magnetic disk when the magnetic disk drive is inserted into the slot of the information processing apparatus and a second position in which it lifts the arm to bring the magnetic head out of contact with the magnetic disk when the magnetic disk drive is removed from the slot, a support for supporting the lift member for movement between the first and second positions thereon, and an interlocking device for moving the lift member between the first and second positions in response to insertion and removal of the magnetic disk drive into and from the slot of the information processing apparatus.

14 Claims, 9 Drawing Sheets

HEAD LIFT MECHANISM IMPLEMENTED IN A REMOVABLE MAGNETIC DISK DRIVE

RELATED APPLICATION

This is a continuation of application Ser. No. 08/253,334, filed on Jun. 3, 1994 now abandoned.

BACKGROUND OF THE INVENTION

1. Field of the Invention

This invention relates to a magnetic disk drive which can be inserted into and removed from a slot formed in an information processing apparatus such as a note type personal computer or a portable word processor, and more particularly to a head lift mechanism for a magnetic disk drive of the type mentioned.

2. Description of the Related Art

In recent years, there has been a demand to reduce the size and increase the capacity of the magnetic disk drive, which is one type of external storage apparatus for computers. In a magnetic disk drive for a computer, a floating magnetic head is employed to prevent possible damage caused by contact thereof with a magnetic disk medium. The magnetic head of the magnetic disk drive floats keeping a small gap (0.2 to 0.3 μm) above the magnetic disk, under the balance between the floating force produced by a flow of air upon high speed rotation (for example, 3,600 rpm) of the magnetic disk and the force of a spring arm which resiliently urges the magnetic head toward the magnetic disk, and reads or writes data from or onto the magnetic disk.

When rotation of the magnetic disk stops, the magnetic head is brought into contact with the magnetic disk by the spring force of the spring arm. Accordingly, when the magnetic disk is not in a rotating condition, the head may possibly adhere to the magnetic disk. Therefore, preferably, the head is normally kept out of contact with the magnetic disk when the magnetic disk is not in a rotating condition.

A conventional magnetic disk drive for a computer adopts a contact start stop (CSS) system for the relationship between the head and the magnetic disk. In the contact start stop system, while the magnetic disk is rotating, the head floats, keeping a small gap above the magnetic disk under the balance between the floating force caused by a flow of air produced by high speed rotation of the magnetic disk and the force of the spring arm which resiliently urges the head toward the disk. When rotation of the magnetic disk stops, the head is moved to a contact allowing area on the magnetic disk and is brought into contact with the magnetic disk there. While the magnetic disk remains stopped, the head and the magnetic disk remain in contact with each other.

Since the surfaces of a magnetic disk and a magnetic head are processed into mirror faces, the head may possibly adhere closely to the magnetic disk while the magnetic disk is in a stopping condition. Consequently, when the disk drive is re-started, an overload is applied to a spindle motor in order to rotate the magnetic disk, and if it tries to rotate the disk forcibly, then destruction of the head and/or damage to the surface of the magnetic disk may possibly take place. Particularly in the case where a small spindle motor with low torque is used (to reduce the size and the power consumption of the magnetic disk drive, as is the trend in recent years) if the magnetic head adheres to the disk, this makes a serious problem when the disk drive is restarted.

Recently, as propagation of small size information processing apparatus such as lap-top personal computers, note type personal computers and portable word processors proceeds, removable magnetic disk drives which can be inserted into and removed from a slot formed in such information processing apparatus have been put on the market. A slot formed in an information processing apparatus normally serves as an insertion slot for an IC card, and to this end, the dimensions of the outer profile of such a removable magnetic disk drive are designed to coincide with the dimensions of the outer profile of such an IC card.

A removable magnetic disk drive adopts a mechanism by which a spindle motor starts its rotation when the magnetic disk drive is inserted into a slot formed in an information processing apparatus, but stops its rotation when the magnetic disk drive is removed from the slot. Also such a removable magnetic disk drive has a problem in that, since it employs the CSS system for the relationship between the head and the magnetic disk, when the magnetic disk does not rotate, the head and the magnetic disk adhere to each other, resulting in failure in re-starting of the magnetic disk drive.

Further, with the removable magnetic disk drive, it sometimes occurs that, if the magnetic disk drive is removed from the slot in error while the power source is on, the magnetic disk may contact with and adhere to the disk at the position. Further, since the magnetic disk drive itself is portable, there is the possibility that the magnetic disk drive may fall inadvertently. Accordingly, there is a problem in that, when the magnetic disk drive falls, the magnetic head and the disk can be damaged by each other.

SUMMARY OF THE INVENTION

It is therefore an object of the present invention to provide a removable magnetic disk drive which includes a head lift mechanism by which adhesion between a magnetic head and a magnetic disk can be prevented.

It is another object of the present invention to provide a removable magnetic disk drive which includes a head lift mechanism which can reduce the power consumption upon starting of a spindle motor and which can also protect a magnetic head and a magnetic disk against damage due to inadvertent falling.

In accordance with an aspect of the present invention, there is provided a magnetic disk drive which is capable of being inserted into and removed from a slot formed in an information processing apparatus, comprising a housing having a base and a cover, a spindle assembly supported for rotation on the base, a magnetic disk mounted on the spindle assembly, a magnetic head for writing and reading out data onto and from the magnetic disk, an arm having the magnetic head supported at an end thereof, first supporting means for pivotally supporting the arm, actuator means operatively connected to the other end of the arm for pivoting the arm around the first supporting means, a lift member movable between a first position in which the lift member is spaced away from the arm to permit the magnetic head to be contacted with the magnetic disk when the magnetic disk drive is inserted in the slot of the information processing apparatus and a second position in which the lift member lifts the arm to bring the magnetic head out of contact with the magnetic disk when the magnetic disk drive is removed from the slot, second supporting means for supporting the lift member for movement between the first and second positions thereon, and interlocking means for moving the lift member between the first and second positions in response to insertion and removal of the magnetic disk drive into and from the slot of the information processing apparatus.

The second supporting means includes a shaft supporting the lift member at an end portion thereof, and a first coil spring for urging the lift member toward the second position. The interlocking means includes a protruding member movable between a pushed-in position in which the protruding member is pushed in the housing and a protruding position in which the protruding member protrudes from the housing in response to insertion and removal of the magnetic disk drive into and from the slot of the information processing apparatus, a block integrally connected to the protruding member and having an inclined face, a second coil spring for urging the protruding member toward the protruding position, and a slide member mounted on the shaft for sliding, in response to movement of the protruding member toward the pushed-in position, on the inclined face of the block to move the lift member to the first position against the urging force of the first coil spring.

Preferably, a guide rail for guiding insertion and removal of the magnetic disk drive into and from the slot of the information processing apparatus is integrally secured to the housing. In a condition wherein the magnetic disk drive is removed from the slot of the information processing apparatus, the lift member is moved to the second position by the interlocking means to lift the arm. Consequently, the magnetic head and the magnetic disk are brought out of contact with each other, and adhesion between them is prevented.

When the magnetic disk drive is inserted into the slot of the information processing apparatus, the lift member is moved by the interlocking means to the first position in which it is spaced away from the arm. Consequently, contact between the magnetic head and the magnetic disk is permitted. However, since a mechanism by which rotation of the spindle is started when the magnetic disk drive is inserted into the slot of the information processing apparatus is provided, the head floats above the magnetic disk keeping a small gap between them.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

In the following description, embodiments of the present invention will be described in detail with reference to the drawings.

Figure 1:
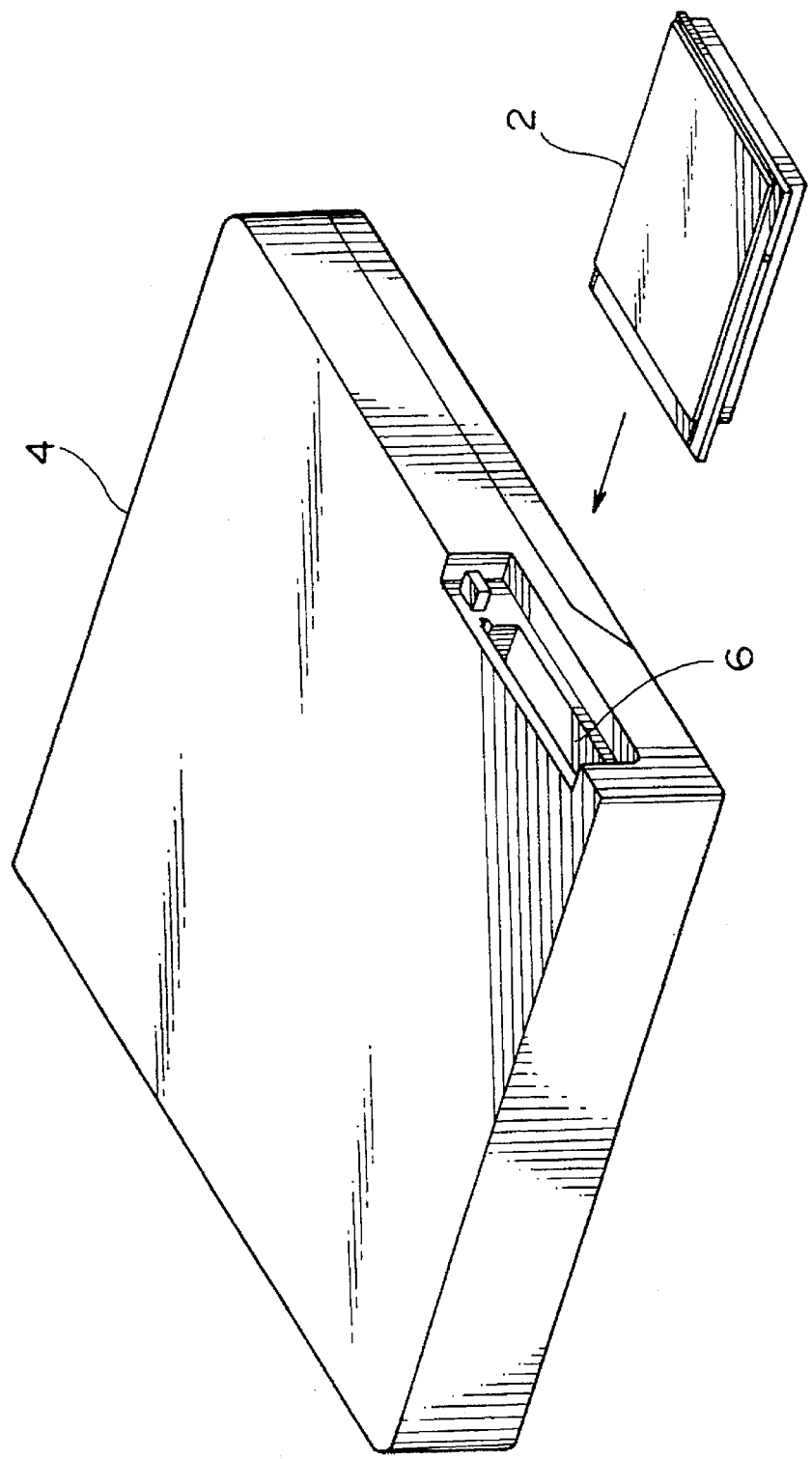
FIG. 1 is a perspective view illustrating a manner in which a magnetic disk drive is inserted into a slot of a note type personal computer.
Figure 2:
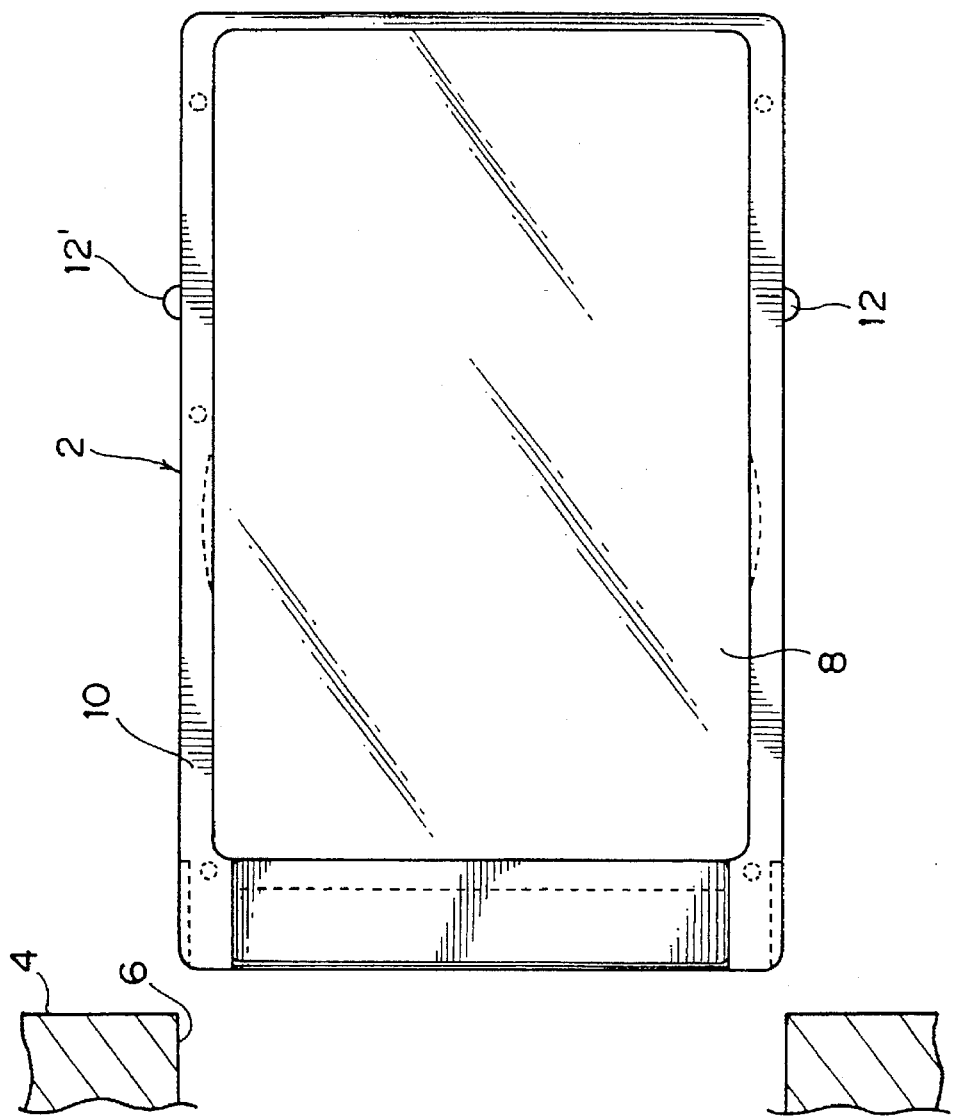
FIG. 2 is a horizontal sectional view illustrating the relationship between the slot and the magnetic disk drive.
Figure 3:
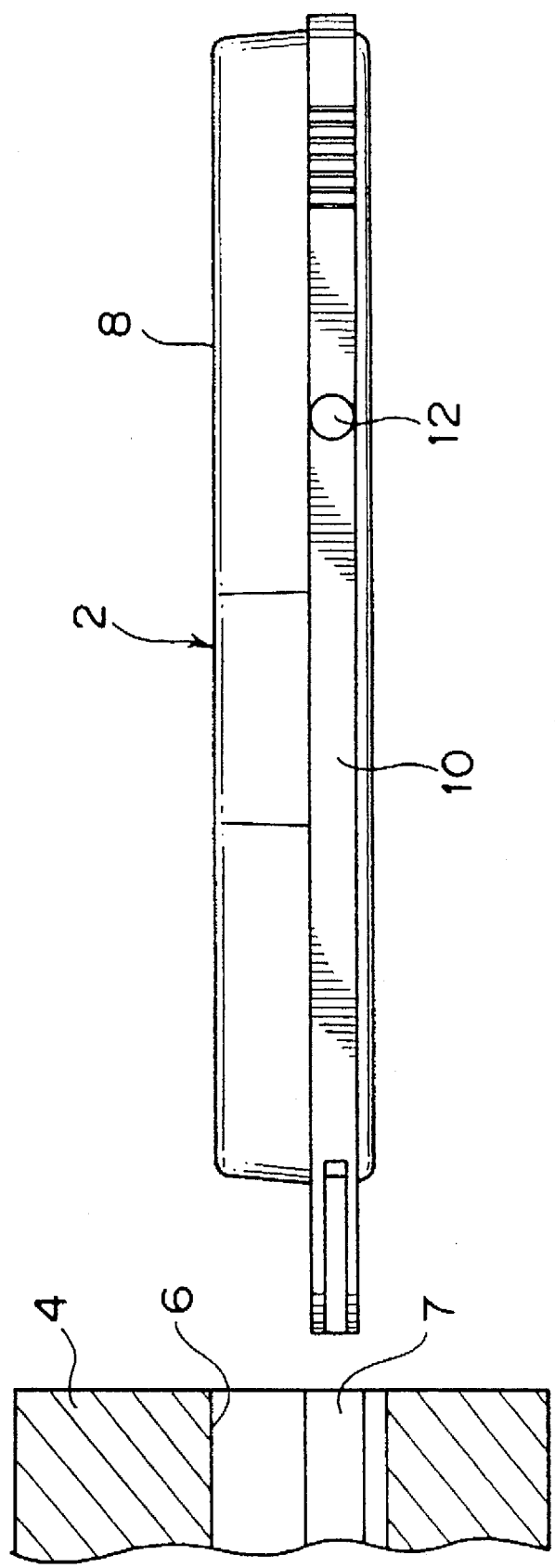
FIG. 3 is a vertical sectional view illustrating the relationship between the slot and the magnetic disk drive.

Referring first to FIG. 1, a slot 6 is formed in a side wall of a note type personal computer 4, and a magnetic disk drive 2 is inserted into the slot 6. The slot 6 has specified dimensions so that an IC card can be inserted into it. To this end, as shown in FIGS. 2 and 3, a U-shaped guide rail 10 is fixed to an outer periphery of a housing 8 of the magnetic disk drive 2 so as to make the dimensions of the outer profile of the magnetic disk drive 2 equal to the specified dimensions of an IC card. A pair of protruding members 12 and 12', which will be hereinafter described in detail, extend outwardly from the opposite side faces of the magnetic disk drive 2. As shown in FIG. 3, a pair of guide grooves 7 are formed in the slot 6 of the note type personal computer 4, and the guide rail 10 of the magnetic disk drive 2 is inserted into the guide grooves 7.

Figure 4:
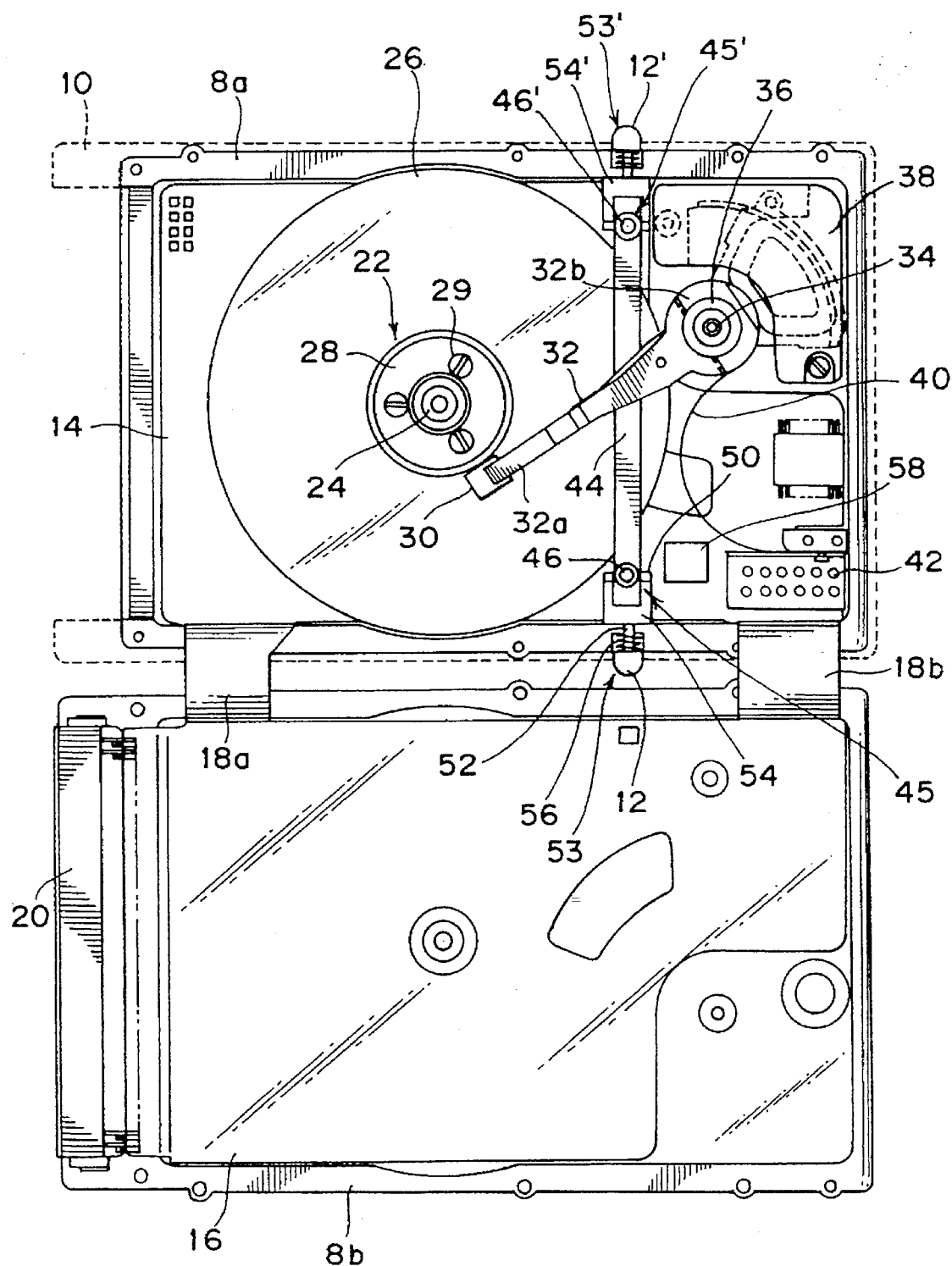
FIG. 4 is a plan view of a first embodiment of the present invention when it is removed from the slot and a cover is open.

Subsequently, a removable magnetic disk drive according to a first embodiment of the present invention will be described with reference to FIGS. 4 to 7. Referring first to FIG. 4, there is shown a plan view of the removable magnetic disk drive of the first embodiment in a condition wherein it has been removed from the slot 6 of the note type personal computer 4 and with the cover open. A housing 8 is constituted from a base 8a and a cover 8b which are fastened to each other by means such as screws. A flexible printed circuit board 14 is disposed on the base 8a, and another flexible printed circuit board 16 is disposed on the cover 8b. The flexible printed circuit boards 14 and 16 are connected to each other by way of connecting flexible printed circuit boards 18a and 18b. A connector 20 is mounted on the cover 8b is electrically connected to the flexible printed circuit board 16.

A spindle assembly 22 is mounted for rotation on the base 8a. The spindle assembly 22 includes a fixed shaft 24, a spindle hub (not shown) is disposed for rotation around the fixed shaft 24, and a spindle motor (not shown) is disposed between the fixed shaft 24 and the spindle hub. A clamper 28 is fastened to the spindle hub (not shown) by screws 29 for securing a magnetic disk 26 to the spindle hub.

A magnetic head 30 for writing and reading out data onto and from the magnetic disk 26 is supported at one end 32a of an arm 32. The arm 32 is mounted at the other end 32b thereof for pivotal motion around a fixed shaft 34 by way of a bearing 36. Reference numeral 38 denotes a voice coil motor operatively connected to the other end 32b of the arm 32 to rock the arm 32 around the shaft 34. Since the voice coil motor 38 is of a type conventionally well known in the art, detailed construction and description of the same are omitted.

In order to transmit a data signal to be read or written by the magnetic head 30, a flexible printed circuit board 40 is connected at an end thereof to the other end 32b of the arm 32, and the other end of the flexible printed circuit board 40 is connected to a connector 42. As can be seen from FIG. 5, a pair of magnetic heads 30 are provided in order to effect writing and reading out of data onto and from the opposite front and rear faces of the magnetic disk 26, and a pair of arms 32 for supporting the magnetic heads 30 are mounted for individual pivotal motion around the fixed shaft 34. Each of the arms 32 is formed from, for example, a stainless steel plate and has a spring characteristic of resiliently urging the magnetic head 30 mounted at the end thereof toward the magnetic disk 26.

Reference numeral 44 denotes a lift member, which is supported at the opposite ends thereof by a pair of supporting means 45 and 45' for movement between a first position in which it is spaced away from the corresponding arm 32 to allow the corresponding magnetic head 30 to be contacted with the magnetic disk 26 when the magnetic disk drive 2 is inserted into the slot 6 of the note type personal computer 4 and a second position in which it lifts the arm 32 to hold the magnetic head 30 out of contact with the magnetic disk 26 when the magnetic disk drive 2 is removed from the slot 6. As can be seen from FIG. 5, in order to lift the two arms 32, a pair of lift members 44 are provided with the magnetic disk 26 interposed therebetween.

The supporting means 45 includes a shaft 46 for supporting the ends of the lift members 44, and a coil spring 48 mounted on the shaft 46 for urging the lift members toward the respective second positions. The lift members 44 are supported at the other ends thereof by the supporting means 45' which has a same construction as the supporting means 45. Also the supporting means 45' includes a shaft 46', and a coil spring 48' mounted on the shaft 46' for urging the lift members 44 toward the respective second positions.

Located on the opposite sides of the magnetic disk drive 2 are a pair of interlocking means 53 and 53' for moving the lift members 44 between the first positions and the second positions in response to insertion and removal of the magnetic disk driver 2 into and from the slot 6 of the note type personal computer 4. Since the construction of the interlocking means 53' is similar to the construction of the interlocking means 53, components thereof are denoted by like reference numerals with the mark ' added thereto and the description thereof is omitted herein.

Figure 5:
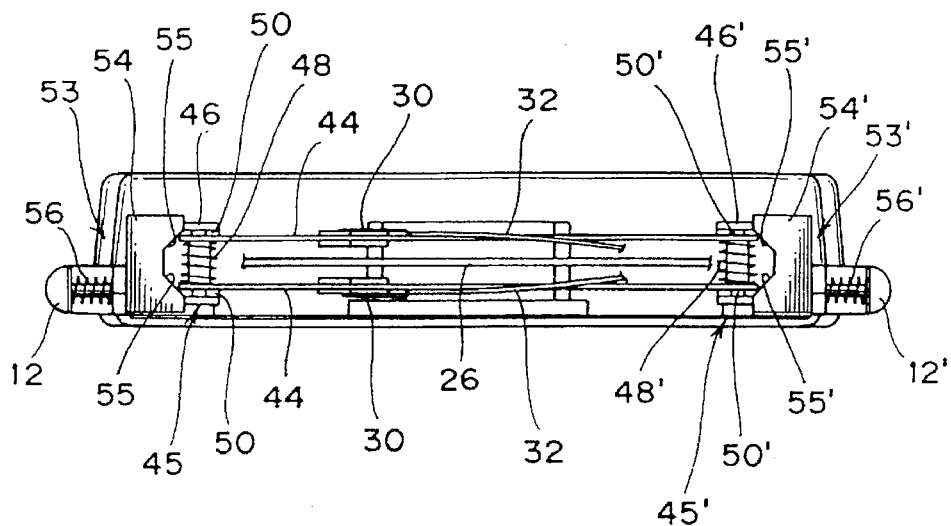
FIG. 5 is a side elevational view of the first embodiment, shown removed from the slot.
Figure 6:
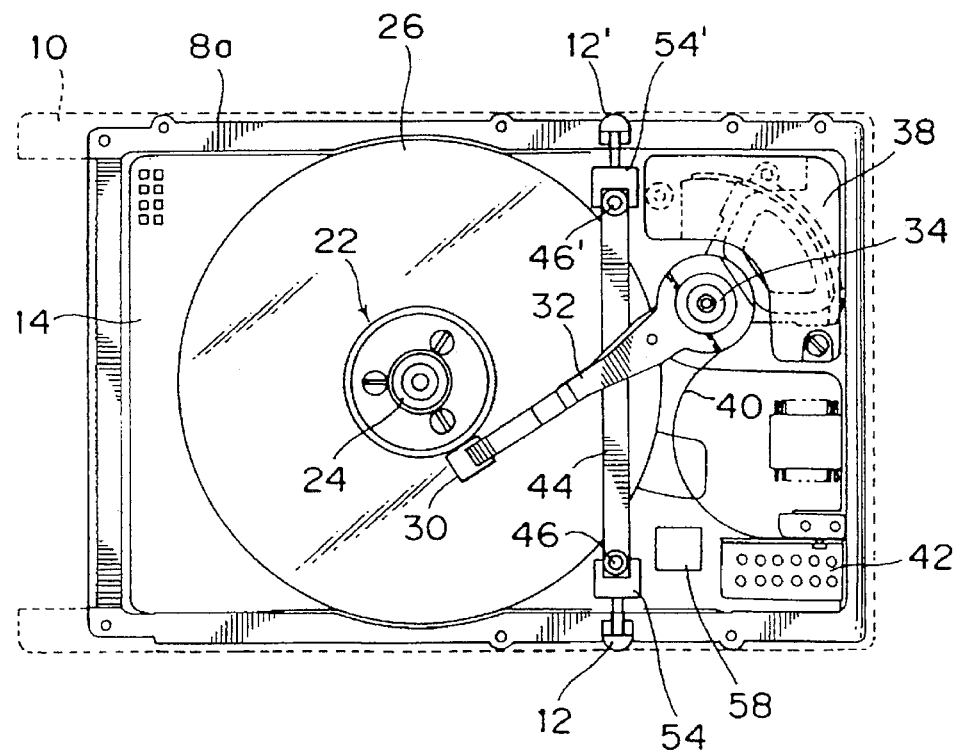
FIG. 6 is a plan view of the first embodiment, shown inserted into the slot with the cover omitted.

The interlocking means 53 is constructed in the following manner. In particular, the protruding member 12 is connected integrally to a block 54 by way of a connecting member 52. As shown in FIG. 5, the block 54 has a pair of inclined faces 55 formed thereon. The protruding member 12 is movable between a pushed-in position (shown in FIGS. 6 and 7 in which it is pushed in the housing 8) and a protruding position (shown in FIGS. 4 and 5 in which it protrudes from the housing 8). A coil spring 56 is mounted on the connecting member 52 and normally urges the protruding member 12 towards the protruding position. As shown in FIGS. 4 and 6, the protruding member 12 is provided such that it extends through the guide rail 10 indicated by a broken line. In other words, the protruding member 12 is provided to make effective use of the space of a portion of the guide rail 10.

As best shown in FIG. 5, a pair of slide members 50 are mounted on the shaft 46 such that they slide, in response to movement of the protruding member 12 to its pushed-in position, on the inclined faces 55 of the block 54 to move the pair of lift members 44 to the respective first positions against the urging force of the coil spring 48. A filter 58 is provided on the base 8a in the proximity of the lift member 44 to attract dust generated by contact between the arms 32 and the lift members 44.

In the condition shown in FIGS. 4 and 5 wherein the magnetic disk drive 2 is removed from the slot 6 of the note type personal computer 4, the protruding members 12 and 12' are urged to the protruding positions by the coil springs 56 and 56', respectively. Consequently, the blocks 54 and 54' are retracted from the lift members 44 so that the pair of lift members 44 are allowed to be lifted to the second positions shown in FIG. 5 by the urging forces of the coil springs 48 and 48', respectively. Consequently, the lift members 44 lift the respective arms 32 to bring the magnetic heads 30 and the magnetic disk 26 out of contact with each other. In this condition, even if the magnetic disk drive falls inadvertently, since the arms 32 are held by the respective lift members 44, the magnetic heads 30 are not brought into contact with the magnetic disk 26 at all, and therefore, the magnetic heads 30 and the magnetic disk 26 are prevented from damaging each other.

Figure 7:
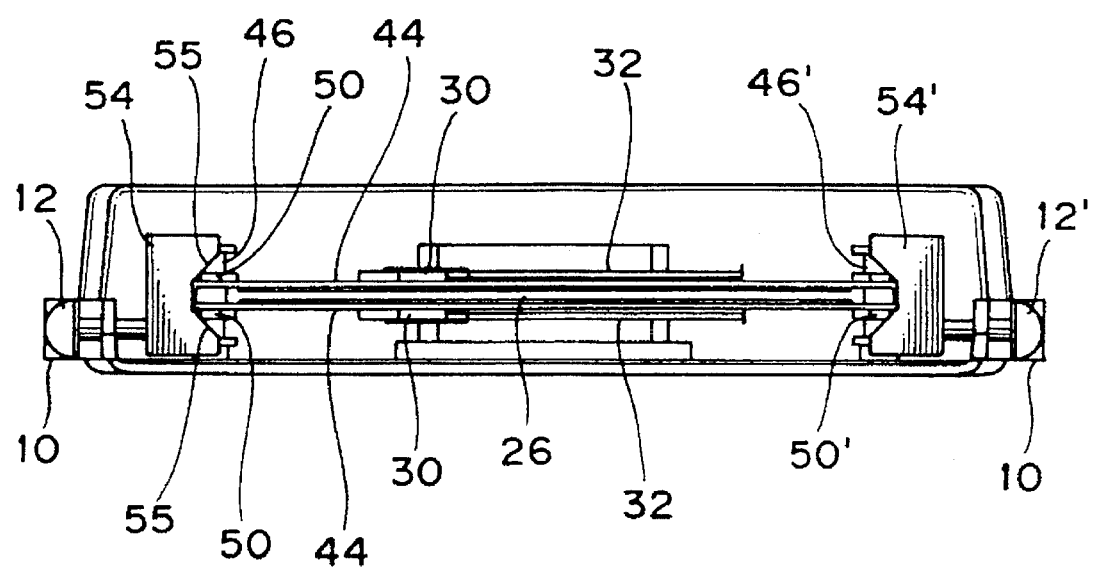
FIG. 7 is a schematic side elevational view of the first embodiment, shown inserted into the slot.

If the magnetic disk drive 2 is inserted into the slot 6 of the note type personal computer 4, then the protruding members 12 and 12' provided on the opposite sides of the magnetic disk drive 2 are moved to their pushed-in positions. This condition is shown in FIGS. 6 and 7. When the protruding members 12 and 12' are moved to the pushed-in positions, the blocks 54 and 54' are moved toward the respective lift members 44. Consequently, the slide members 50 and 50' slide on the inclined faces 55 and 55' of the blocks 54 and 54' to approach each other.

As a result, the pair of lift members 44 are moved to approach each other to the positions shown in FIG. 7, and are spaced away from the corresponding arms 32 so that the magnetic heads 30 are allowed to be contacted with the magnetic disk 26 by the spring forces of the arms 32. However, simultaneously while the magnetic disk drive 2 is inserted into the slot 6 of the note type personal computer 4, the spindle motor is connected to the power source byway of the connector 20 so that rotation of the spindle motor is started. Consequently, as the magnetic disk 26 rotates at a high speed (for example, 3,600 rpm), the magnetic heads 30 float from the magnetic disk 26 keeping small gaps (about 0.2 to 0.3 µm) from the magnetic disk 26 under the balance between the floating forces caused by the flow of air produced by rotation of the magnetic disk 26 and the forces of the arms 32 urging the heads 30 toward the magnetic disk 26.

Figure 8:
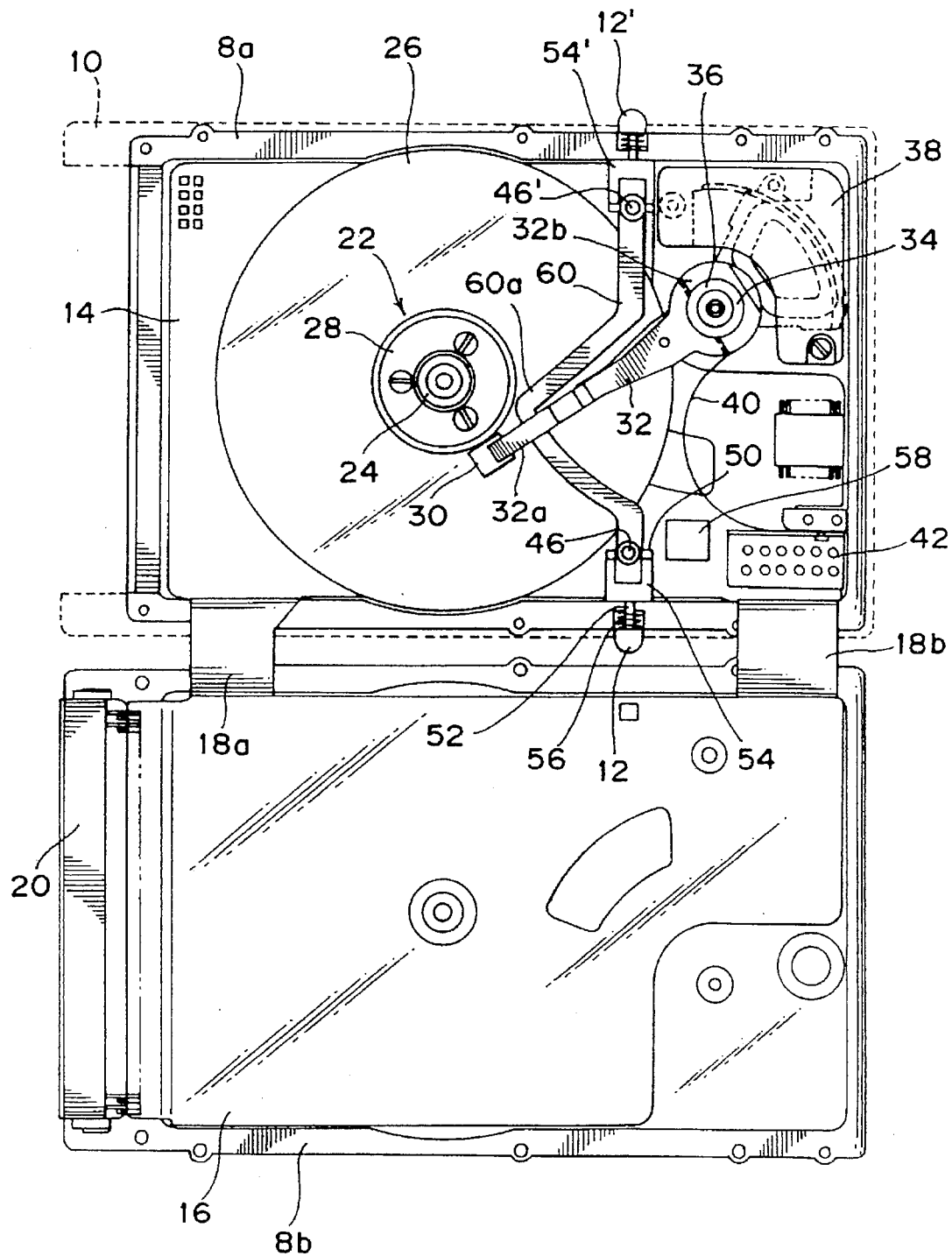
FIG. 8 is a plan view of a second embodiment of the present invention, shown removed from the slot and with the cover open.

Referring now to FIG. 8, a plan view of a second embodiment of the present invention is shown in a condition wherein it is removed from the slot of the note type personal computer and with the cover open. The present embodiment is similar to the first embodiment except that the profile of a lift member 60 is different from that of the lift member 44 in the first embodiment described above, and accordingly, corresponding elements are denoted by same reference numerals and the overlapping description of them is omitted herein.

The lift member 60 has an intermediate bent portion 60a. Consequently, since an arm 32 can be supported at a portion thereof in the proximity of an end portion 32a on the lift member 60, the magnetic head 30 can be floated or lifted more readily from the magnetic disk 26 than that in the first embodiment wherein the base end portion of the arm 32 is lifted. In particular, since a portion of the arm 32 in the proximity of the head 30 has a high degree of elasticity, the magnetic head 30 can float from the magnetic disk 26 with a comparatively weak force as the portion of the arm 32 adjacent the magnetic head 30 is supported at the intermediate bent portion 60a of the lift member 60 in this manner. Further, since such intermediate bent portion 60a is provided on the lift member 60, movement of the head 30 can be performed smoothly without being disturbed by the lift member 60.

Subsequently, a magnetic disk drive of a third embodiment of the present invention will be described with reference to FIGS. 9 and 10. In FIG. 10, a magnetic disk, a head and an arm are omitted for clarified illustration. The present embodiment is different from the first embodiment described above in that a lift member 62 is formed as a cantilever supported at an end thereof, and the other construction of the present embodiment is similar to that of the first embodiment. Accordingly, corresponding portions are denoted by same reference numerals and the overlapping description of them is omitted herein.

Figure 9:
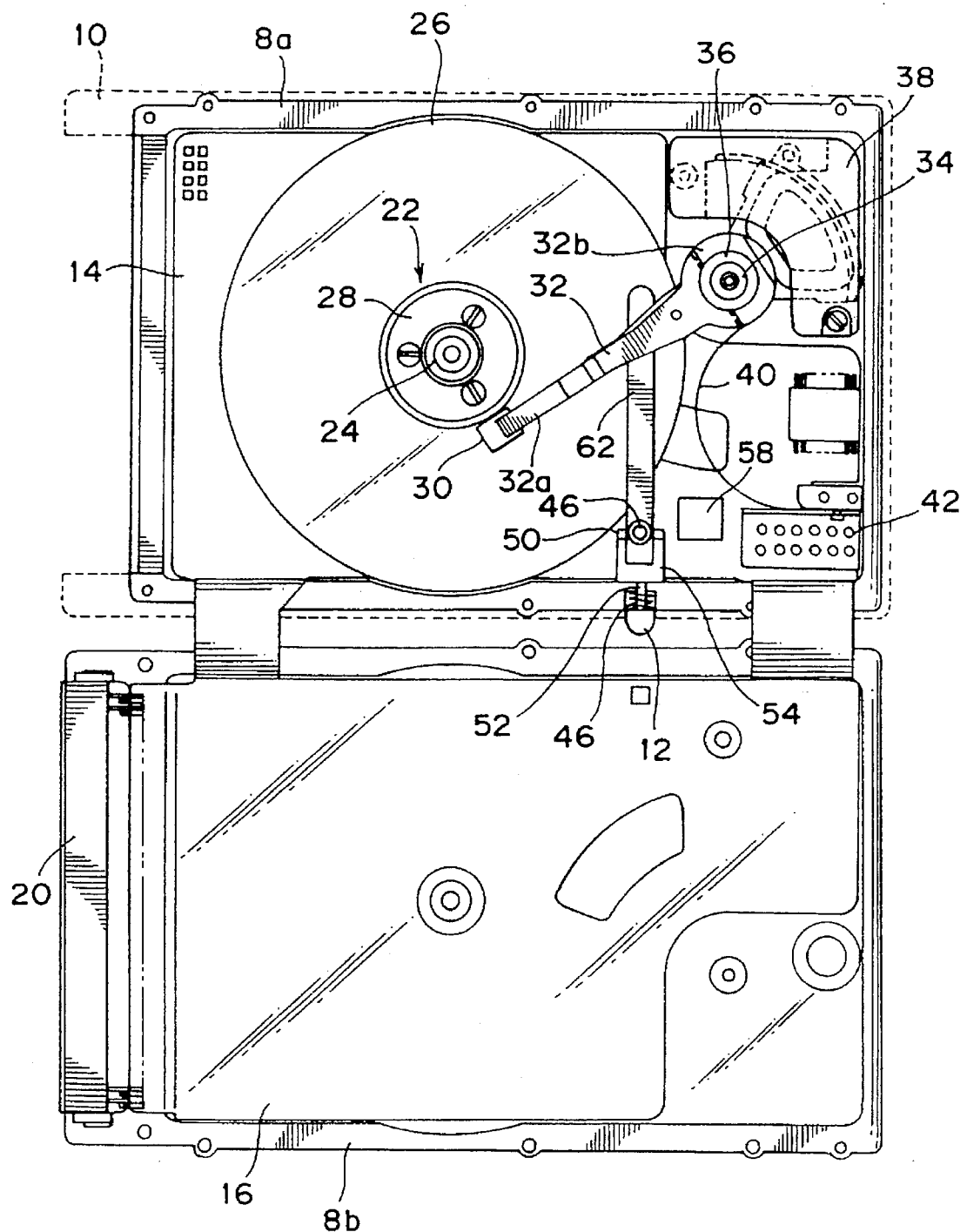
FIG. 9 is a plan view of a third embodiment of the present invention, shown removed from the slot with the cover open.
Figure 10:
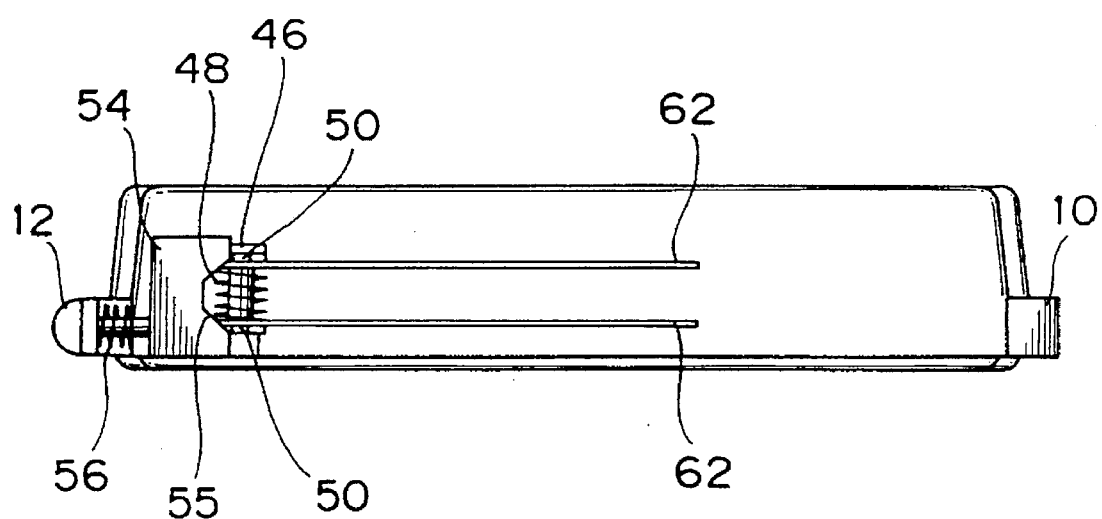
FIG. 10 is a schematic side elevational view of the third embodiment, shown removed from the slot.

In a condition wherein the magnetic disk drive is removed from the slot 6 of the note type personal computer 4, since the protruding member 12 is urged to its protruding position shown in FIGS. 9 and 10 by the coil spring 56, the block 54 is moved away from the pair of lift members 62. Consequently, the lift members 62 are moved away from each other by the coil spring 48 to lift the corresponding arms 32. Consequently, the magnetic heads 30 supported on the arms 32 are lifted from the magnetic disk 26.

When the magnetic disk drive is inserted into the slot 6 of the note type personal computer 4, the protruding member 12 is moved to the pushed-in position, whereupon the block 54 is moved toward the lift members 62. Consequently, the pair of slide members 50 slide on the inclined faces 55 of the block 54 to approach each other against the urging force of the coil spring 48 to move the pair of lift members 62 toward each other. As a result, the lift members 62 are spaced away from the corresponding arms 32 so that the magnetic heads 30 are permitted to be contacted with the magnetic disk 26 by the spring forces of the arms 32.

Since the magnetic disk drive of the present invention is constructed in such a manner as described in detail above, when the magnetic disk drive is removed from a slot of an information processing apparatus, adhesion between the magnetic head and the magnetic disk can be prevented effectively. Consequently, otherwise possible damage to the magnetic head and/or the magnetic disk can be prevented. Further, since the magnetic head does not adhere to the magnetic disk, the frictional resistance of the magnetic head can be reduced, and the load to the spindle motor when the magnetic disk is started to be rotated can be minimized. Consequently, the magnetic disk drive can contribute to reduction of the power consumption and also of the size of the motor.

Further, since otherwise possible damage to the head or the disk can be prevented against an inadvertent fall, enhancement of the security and the durability of the magnetic disk drive can be achieved with a simple construction, even where the magnetic disk drive is of the portable type. The head lift mechanism of the present invention does not require provision of a driving source for exclusive use and can achieve reduction of the size.

What is claimed is:

1. A magnetic disk drive which is capable of being inserted into and removed from a slot formed in an information processing apparatus, comprising:

a housing having a base and a cover;

a spindle assembly supported for rotation on said base;

a magnetic disk mounted on said spindle assembly;

a magnetic head for writing and reading out data onto and from said magnetic disk;

an arm having said magnetic head supported at an end thereof;

first supporting means for pivotally supporting said arm;

actuator means operatively connected to the other end of said arm for pivoting said arm around said first supporting means;

a lift member movable towards and away from said arm, between a first position in which said lift member is spaced away from said arm to permit said magnetic head to be contacted with said magnetic disk when said magnetic disk drive is inserted into said slot of said information processing apparatus and a second position in which said lift member lifts said arm to bring said magnetic head out of contact with said magnetic disk when said magnetic disk drive is removed from said slot;

second supporting means for supporting said lift member for movement between the first and second positions thereon; and interlocking means for moving said lift member to the first position when said magnetic disk drive is inserted into the slot of said information processing apparatus and for moving said lift member to the second position when said magnetic disk drive is removed from the slot of said information processing apparatus, said interlocking means including a block having an inclined face and a slide member such that said slide member rides along said inclined face to move said lift member between the first position and the second position.

2. A magnetic disk drive as claimed in claim 1, further comprising a guide rail integrally secured to a rim of said housing for guiding insertion and removal of said magnetic disk drive into and from said slot of said information processing apparatus.

3. A magnetic disk drive as claimed in claim 1, wherein said protruding member is provided such that it extends through a side face of said housing.

4. A magnetic disk drive as claimed in claim 1, wherein said first and second protruding members are provided such that they extend through opposite side faces of said housing.

5. A magnetic disk drive as claimed in claim 1, wherein said lift member has an intermediate bent portion adapted to lift a portion of said arm in the proximity of the one end portion thereof.

6. A magnetic disk drive which is capable of being inserted into and removed from a slot formed in an information processing apparatus, comprising:

a housing having a base and a cover;

a spindle assembly supported for rotation on said base;

a magnetic disk mounted on said spindle assembly;

first and second magnetic heads for writing and reading out data onto and from the opposite front and rear faces of said magnetic disk;

first and second arms having said first and second magnetic heads supported at ends thereof;

first supporting means for pivotally supporting said first and second arms;

actuator means operatively connected to the other ends of said first and second arms for pivoting said first and second arms around said first supporting means;

a first lift member positioned between said magnetic disk and said first arm;

a second lift member positioned between said magnetic disk and said second arm;

said first and second lift members being movable toward and away from said first and second arms, respectively, between a first position in which the first and the second lift members are spaced away from said first and second arms, respectively, to permit said first and second magnetic heads to be contacted with said magnetic disk when said magnetic disk drive is inserted into said slot of said information processing apparatus and a second position in which said first and second lift members lift said first and second arms, respectively, to bring said first and second magnetic heads out of contact with said magnetic disk when said magnetic disk drive is removed from said slot;

second supporting means for supporting said first and second lift members for movement between the first and second positions thereon; and interlocking means for moving said lift members to the first position when said magnetic disk drive is inserted into the slot of said information processing apparatus and for moving said lift members to the second position when said magnetic disk drive is removed from the slot of said information processing apparatus, said interlocking means including a block having an inclined face and a slide member such that said slide member rides along said inclined face to move the lift members between the first position and the second position.

7. A magnetic disk drive as claimed in claim 5, further comprising a guide rail integrally secured to said housing for guiding insertion and removal of said magnetic disk drive into and from said slot of said information processing apparatus.

8. A magnetic disk drive as claimed in claim 7, wherein said protruding member is provided such that it extends through said guide rail.

9. A magnetic disk drive as claimed in claim 1, wherein said first and second protruding members are provided such that they extend through opposite side faces of said housing.

10. A magnetic disk drive as claimed in claim 6, wherein each of said first and second lift members has an intermediate bent portion adapted to lift a portion of a corresponding one of said first and second arms in the proximity of the one end portion thereof.

11. A magnetic disk drive which is capable of being inserted into and removed from a slot formed in an information processing apparatus, comprising:

a housing having a base and a cover;

a spindle assembly supported for rotation on said base;

a magnetic disk mounted on said spindle assembly;

a magnetic head for writing and reading out data onto and from said magnetic disk;

an arm having said magnetic head supported at an end thereof;

first supporting means for pivotally supporting said arm;

actuator means operatively connected to the other end of said arm for pivoting said arm around said first supporting means;

a lift member movable between a first position in which said lift member is spaced away from said arm to permit said magnetic head to be contacted with said magnetic disk when said magnetic disk drive is inserted into said slot of said information processing apparatus and a second position in which said lift member lifts said arm to bring said magnetic head out of contact with said magnetic disk when said magnetic disk drive is removed from said slot;

second supporting means for supporting said lift member for movement between the first and second positions thereon, said second supporting means including a shaft supporting said lift member at an end portion thereof, and a first coil spring for urging said lift member toward the second position; and interlocking means for moving said lift member between the first and second positions in response to insertion and removal of said magnetic disk drive into and from said slot of said information processing apparatus, said interlocking means including a protruding member movable between a pushed-in position in which said protruding member is pushed into said housing and a protruding position in which said protruding member protrudes from said housing in response to insertion and removal of said magnetic disk drive into and from said slot of said information processing apparatus, a block integrally connected to said protruding member and having an inclined face, a second coil spring for urging said protruding member toward the protruding position, and a slide member mounted on said shaft for sliding, in response to movement of said protruding member toward the pushed-in position, on said inclined face of said block to move said lift member to the first position against the urging force of said first coil spring.

12. A magnetic disk drive which is capable of being inserted into and removed from a slot formed in an information processing apparatus, comprising:

a housing having a base and a cover;

a spindle assembly supported for rotation on said base;

a magnetic disk mounted on said spindle assembly;

a magnetic head for writing and reading out data onto and from said magnetic disk;

an arm having said magnetic head supported at an end thereof;

first supporting means for pivotally supporting said arm;

actuator means operatively connected to the other end of said arm for pivoting said arm around said first supporting means;

a lift member movable between a first position in which said lift member is spaced away from said arm to permit said magnetic head to be contacted with said magnetic disk when said magnetic disk drive is inserted into said slot of said information processing apparatus and a second position in which said lift member lifts said arm to bring said magnetic head out of contact with said magnetic disk when said magnetic disk drive is removed from said slot;

second supporting means for supporting said lift member for movement between the first and second positions thereon; and interlocking means for moving said lift member between the first and second positions in response to insertion and removal of said magnetic disk drive into and from said slot of said information processing apparatus; wherein said second supporting means includes first and second shafts supporting said lift member at the opposite end portions thereof, and first and second coil springs operatively associated with said first and second shafts for urging said lift member toward the second position; and said interlocking means includes first and second protruding members each movable between a pushed-in position in which the protruding member is pushed into said housing and a protruding position in which the protruding members protrudes from said housing in response to insertion and removal of said magnetic disk drive into and from said slot of said information processing apparatus, first and second blocks integrally connected to said first and second protruding members, respectively, and each having an inclined face, third and fourth coil springs for urging said first and second protruding members toward the protruding positions, respectively, and first and second slide members mounted on said first and second shafts for sliding, in response to movement of said first and second protruding members toward the pushed-in positions, on the inclined faces of said first and second blocks to move said lift member toward the first position against the urging forces of said first and second coil springs.

13. A magnetic disk drive which is capable of being inserted into and removed from a slot formed in an information processing apparatus, comprising:

a housing having a base and a cover;

a spindle assembly supported for rotation on said base;

a magnetic disk mounted on said spindle assembly;

first and second magnetic heads for writing and reading out data onto and from the opposite front and rear faces of said magnetic disk;

first and second arms having said first and second magnetic heads supported at ends thereof;

first supporting means for pivotally supporting said first and second arms;

actuator means operatively connected to the other ends of said first and second arms for pivoting said first and second arms around said first supporting means;

first and second lift members movable between a first position in which the first and the second lift members are spaced away from said first and second arms, respectively, to permit said first and second magnetic heads to be contacted with said magnetic disk when said magnetic disk drive is inserted into said slot of said information processing apparatus and a second position in which the first and the second lift members lift said first and second arms, respectively, to bring said first and second magnetic heads out of contact with said magnetic disk when said magnetic disk drive is removed from said slot;

second supporting means for supporting said first and second lift members for movement between the first and second positions thereon, said second supporting means including a shaft supporting said first and second lift members at end portions thereof, and a first coil spring for urging said first and second lift members toward the second position; and interlocking means for moving said first and second lift members between the first and second positions in response to insertion and removal of said magnetic disk drive into and from said slot of said information processing apparatus, said interlocking means including a protruding member movable between a pushed-in position in which said protruding member is pushed into said housing and a protruding position in which said protruding member protrudes from said housing in response to insertion and removal of said magnetic disk drive into and from said slot of said information processing apparatus, a block integrally connected to said protruding member and having first and second inclined faces, a second coil spring for urging said protruding member toward the protruding position, and first and second side members mounted on said shaft for sliding, in response to movement of said protruding member toward the pushed-in position, on said first and second inclined faces of said block to move said first and second lift members to the first position against the urging force of said first coil spring.

14. A magnetic disk drive which is capable of being inserted into and removed from a slot formed in an information processing apparatus, comprising:

a housing having a base and a cover;

a spindle assembly supported for rotation on said base;

a magnetic disk mounted on said spindle assembly;

first and second magnetic heads for writing and reading out data onto and from the opposite front and rear faces of said magnetic disk;

first and second arms having said first and second magnetic heads supported at ends thereof;

first supporting means for pivotally supporting said first and second arms;

actuator means operatively connected to the other ends of said first and second arms for pivoting said first and second arms around said first supporting means;

first and second lift members movable between a first position in which the first and the second lift members are spaced away from said first and second arms, respectively, to permit said first and second magnetic heads to be contacted with said magnetic disk when said magnetic disk drive is inserted into said slot of said information processing apparatus and a second position in which the first and the second lift members lift said first and second arms, respectively, to bring said first and second magnetic heads out of contact with said magnetic disk when said magnetic disk drive is removed from said slot;

second supporting means for supporting said first and second lift members for movement between the first and second positions thereon; and interlocking means for moving said first and second lift members between the first and second positions in response to insertion and removal of said magnetic disk drive into and from said slot of said information processing apparatus; wherein said second supporting means includes first and second shafts supporting said first and second lift members at the opposite end portions thereof, and first and second coil springs operatively associated with said first and second shafts for urging said first and second lift members toward the second positions; and said interlocking means includes first and second protruding members each movable between a pushed-in position in which the protruding members is pushed into said housing and a protruding position in which the protruding members protrudes from said housing in response to insertion and removal of said magnetic disk drive into and from said slot of said information processing apparatus, a first block integrally connected to said first protruding member and having first and second inclined faces, a second block integrally connected to said second protruding member and having third and fourth inclined faces, third and fourth coil springs for urging said first and second protruding members toward the protruding position, respectively, first and second slide members mounted on said first shaft for sliding, in response to movement of said first protruding member toward the pushed-in position, on said first and second inclined faces of said first block, respectively, to move said first and second lift members toward the first position against the urging force of said first coil spring, and third and fourth slide members mounted on said second shaft for sliding, in response to movement of said second protruding member toward the pushed-in position, on said third and fourth inclined faces of said second block, respectively, to move said first and second lift members toward the first position against the urging force of said second coil spring.

* * * * *

UNITED STATES PATENT AND TRADEMARK OFFICE
CERTIFICATE OF CORRECTION

PATENT NO. : 5,668,682  
DATED : September 16, 1997  
INVENTOR(S) : Takashi Matsumoto It is certified that error appears in the above-identified patent and that said Letters Patent is hereby corrected as shown below:

Column 1, line 24, delete "floats keeping" and insert --floats, keeping-- therefor.

Column 4, line 39, after "8b" insert --and--.

Column 5, line 3, delete "toward" and insert --towards-- therefor.

Column 6, line 30, delete "byway" and insert --by way-- therefor.

UNITED STATES PATENT AND TRADEMARK OFFICE
CERTIFICATE OF CORRECTION

PATENT NO. : 5,668,682
DATED : September 16, 1997
INVENTOR(S) : Takashi Matsumoto It is certified that error appears in the above-identified patent and that said Letters Patent is hereby corrected as shown below:

Column 8, line 29, delete "claim 1" and insert --claim 11-- therefor.

Column 8, line 32, delete "claim 1" and insert --claim 12-- therefor.

Signed and Sealed this

Fifteenth Day of September, 1998

Attest:

BRUCE LEHMAN

Attesting Officer

Commissioner of Patents and Trademarks